(12) United States Patent
Müller

(10) Patent No.: US 7,046,378 B2
(45) Date of Patent: May 16, 2006

(54) DEVICE AND METHOD FOR THE OPTICAL DETECTION OF OBJECTS

(75) Inventor: Klaus Müller, Heidelberg (DE)

(73) Assignee: Hera Rotterdam B.V., Rotterdam (NL)

( * ) Notice: Subject to any disclaimer, the term of this patent is extended or adjusted under 35 U.S.C. 154(b) by 190 days.

(21) Appl. No.: 10/439,095

(22) Filed: May 15, 2003

(65) Prior Publication Data

US 2003/0227635 A1    Dec. 11, 2003

(30) Foreign Application Priority Data

May 17, 2002    (CH) ...................... 834/02

(51) Int. Cl.
*G01B 11/14*    (2006.01)
(52) U.S. Cl. ...................... 356/614; 356/622
(58) Field of Classification Search ............... 356/3, 356/614, 622, 623
See application file for complete search history.

(56) References Cited

U.S. PATENT DOCUMENTS

| | | | | |
|---|---|---|---|---|
| 3,775,012 A | * | 11/1973 | Ling et al. .................... 356/625 |
| 4,968,146 A | * | 11/1990 | Heizmann et al. ........... 356/623 |
| 5,389,777 A | * | 2/1995 | Chin ..................... 250/214 PR |
| 5,532,473 A | * | 7/1996 | Chin ..................... 250/214 PR |
| 6,624,899 B1 | * | 9/2003 | Clark ......................... 356/614 |
| 6,781,705 B1 | * | 8/2004 | Waslowski et al. ......... 356/614 |

* cited by examiner

*Primary Examiner*—Gregory J. Toatley, Jr.
*Assistant Examiner*—Roy M. Punnoose
(74) *Attorney, Agent, or Firm*—Rankin, Hill, Porter & Clark LLP

(57) ABSTRACT

A method and a device for the optical distance measurement and for the optical detection of objects with an at least partially specular reflective surface (12) wherein light through the specular reflective surface (12) and a diffuse scattering at a reflector (4) is directed to light receiving means and detected there.

10 Claims, 2 Drawing Sheets

DEVICE AND METHOD FOR THE OPTICAL DETECTION OF OBJECTS

BACKGROUND OF THE INVENTION

1. Field of the Invention

The present invention is generally related to optically measuring distances and optically detecting objects and, more particularly, to a device and a method for optically measuring distances and optically detecting reflective surfaces.

2. Description of Related Art

One example of a conventional optical sensor 1 is illustrated in FIG. 1: A light beam 11 generated by a laser 2 impinges on an object 12 to be detected and is at least partially diffusely scattered there. Scattered light is received by a receiving lens system 3 at an angle α, which is dependent on the distance of the object from the sensor. The angle α is determined in the receiver. In correspondence with a maximum and a minimum determinable angle of incidence α, a measuring range m results, within which a distance of the object 12 is capable of being determined.

This method has the disadvantage that it does not work in case of reflective mirror-like surfaces because it is based on the diffuse scattering. Accurate detection of the position of reflective surfaces is, inter alia, necessary during the processing of silicon wafers. Here there is the difficulty, that these high-purity—and polished surfaces generate hardly any scattered light. However, scattered light is required by conventional optical sensors in order to detect an object.

As a solution there is the possibility of increasing the amount of scattered light with very powerful lasers and in this manner achieve detection. The disadvantage of the method lies in the hazards for the eyesight of the users that are created by the use of powerful lasers.

A further possibility consists in arranging the optical transmitter and receiver such that the light reflected from the reflective object is directly guided into the receiver. The drawback of this method is the fact that the transmitter, "mirror", and receiver have to be very accurately aligned relative to one another.

SUMMARY OF THE INVENTION

It is an objective of the invention to obtain information about the presence and/or absence of objects by means of an optical method, when the objects are predominantly reflective and exhibit a low light scattering.

The invention exploits these otherwise disadvantageous characteristics in order to direct, with the help of the reflective object, an illuminating beam path and an observing beam path on to a more easily detected, partially diffusely scattering object. In the following, for the sake of simplicity, the mirror-like object, i.e. exhibiting specular reflection, that is to be detected, is called "mirror", and the diffusely scattering object is called "reflector". In analogy, the light reflected by the mirror is designated as "mirrored light" and the light reflected by the "reflector" as "reflected light". The "mirror" does not necessarily have to be a mirror in the conventional meaning of the word, but may be any object at all that comprises a specular reflective or partially specular reflective surface such as, for example, a pane of glass.

Therefore, in case of the distance measurement the sum of the distances from the sensor to the "mirror" and from the "mirror" to the reflector is detected. If the distance of the "mirror" to the sensor changes then, depending on the choice of geometry, the measuring result changes by up to the double amount.

The detection of the presence of the "mirror" can be precisely carried out through the illumination beam path. Only if the illumination, in the ideal case a very narrow beam, impinges on the "mirror" is the receiver, which also observes through the "mirror", capable of detecting a signal. Depending on the arrangement and the beam diameter, in this manner it is possible to accurately determine when a "mirror" moves into the beam path.

A background lying behind the "mirror" viewed from the sensor in preference is designed to be light absorbing. When the mirror is not present, the receiver does not receive a signal. In another embodiment of the invention, the background is at least partially reflective. A reflected light beam is detected in the receiver, the position of the light spot, however, differs from the position of a light spot produced through the mirrors, so that a differentiation on the basis of the angle under which the light spots are detected is possible.

An advantage of the invention is the fact that the reflector may be large in comparison with the measuring beam and, therefore, a precise adjustment does not become necessary. The reflector may be a simple, for example white, object (e.g., made of ceramics, etc.). An accurate alignment of the angle of this part of the device is not necessary. A reflector, for example, may be completely or partially arranged around a light outlet opening of the light source and comprise solely one further opening for a light receiving means of the sensor.

Particularly advantageous for the function of the invention is the circumstance that the "mirror" has a size that transmits a great proportion of the beam path, particularly of the reflected radiation.

In further embodiments of the inventions the reflector described in connection with a triangulation system is utilised, for example in a measuring system, which is based on run-time measurements and/or comprises a coaxial beam path.

The beam path does not have to correspond to a certain geometry; rather it is capable of being adapted for the detection of various positional coordinates of the object The light source may be a laser beam, an LED, or another light source. The light source preferably produces a narrow light beam.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
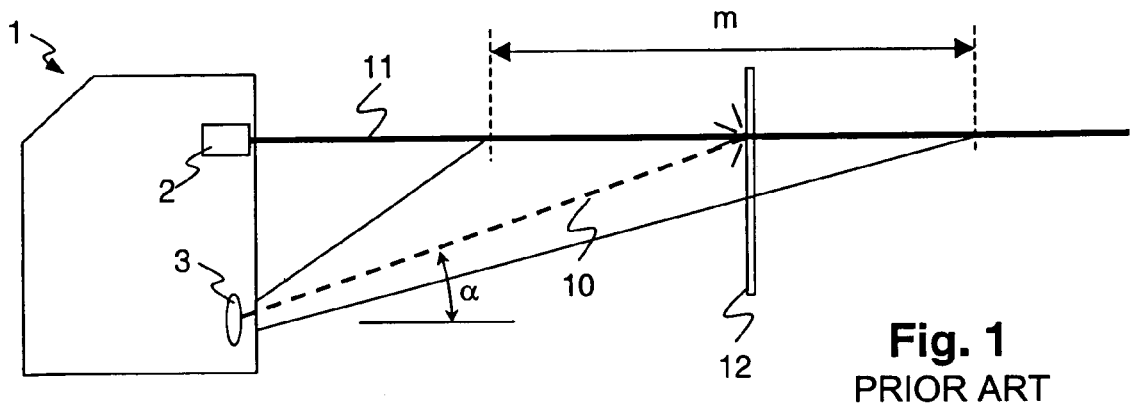
FIG. 1 illustrates an arrangement with an optical triangulation sensor for measuring distances in accordance with prior art.

Initially, it is noted that in the In the Figures the same reference characters designate the same or analogous elements.

Figure 2:
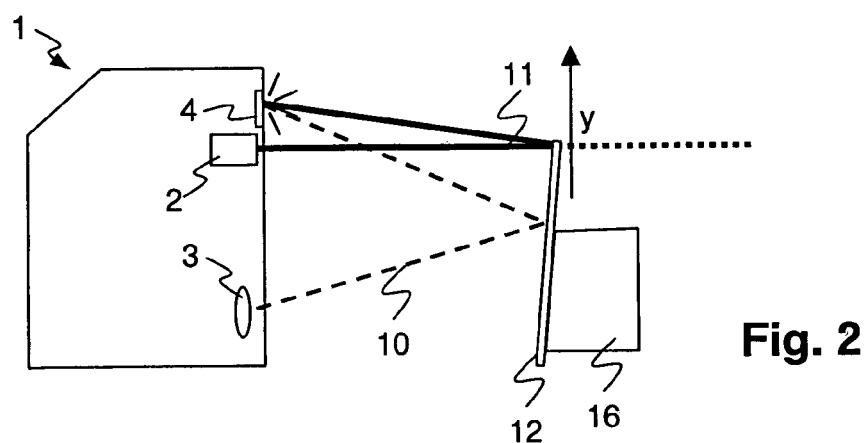
FIGS. 2, 3, and 4 schematically illustrate different arrangements of sensors in accordance with the invention.

FIG. 2 illustrates an embodiment of the invention, which is able to be utilised, when the invention is to be used for the detection of the moving of the "mirror" into a defined field. An optical sensor 1 comprises a light source 2 for the generation of a laser beam or light beam 11 and a light receiving means. The light receiving means comprises a receiving lens system 3, light-sensitive elements of a known type, and integrated or external means of evaluation. With the means of evaluation, an angle of incidence of a light beam and, from it, a presence or a distance of an object are capable of being determined. The optical sensor 1 comprises a reflector 4 exhibiting diffuse reflection. In the application example under consideration, a movement of an article with a mirroring surface 12 into the light beam 11 is to be detected. For this purpose, the object is oriented in a guide or holder 16 such that a vertical surface to the mirroring surface 12 runs not exactly parallel to a beam direction of the reflected and un-mirrored light beam 11, but rather shows a slight inclination relative thereto. An admissible range for values of this inclination results from geometrical considerations from other geometrical characteristics of the arrangement, particularly from a target distance between the optical sensor 1 and the object, a width or a beam angle of the reflected light beam 11, and an expanse of the reflector 4 vertical to the beam direction of the light beam 11.

During an operating of the device in accordance with the invention, the object travels with a direction of movement, which preferably intersects the light beam 11 approximately in a direction y at right angles to the beam direction of the reflected light beam 11. As soon as the laser beam 11 impinges on the slightly inclined mirror 11, it is reflected on to the reflector 4. The light is diffusely scattered by the reflector and subsequently once again reflected by the mirror 12, in order to finally be detected as a reflected light beam 10 by the light receiving means. The mirror has to be slightly inclined. Apart from the inclination of the mirror, however, an adjustment is not necessary.

The arrangement of the reflector 4 in a front side of the sensor 1 in many instances is advantageous. This arrangement is, however, not imperatively necessary.

Figure 3:
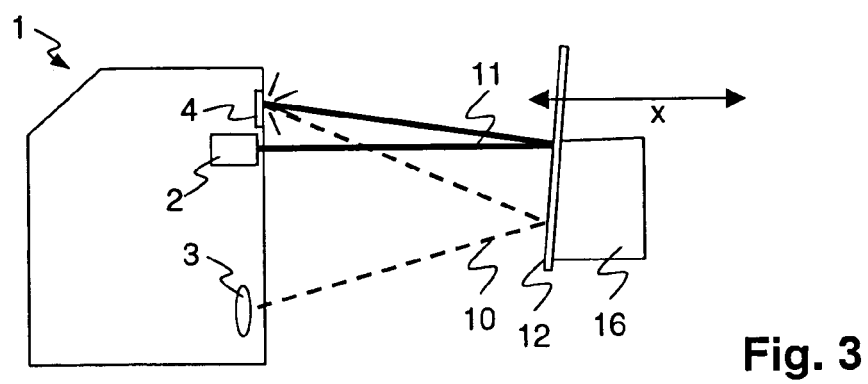

FIG. 3 illustrates how, with the procedure in accordance with the invention, a triangulation measurement for the determination of a distance is capable of being carried out. The distance of the mirror 12 in a direction x, which essentially runs parallel to the beam direction of the light beam 11, is measured. In analogy to the embodiment of FIG. 2, the light beam produced by the light source is thrown back onto the reflector 4 by the mirroring surface 12. The light scattered by the reflector is once again reflected by the mirroring surface 12 and is reflected onto the receiving lens system 3 as a reflected light beam 10. There the angle is determined, under which the light spot reflected on the reflector and mirrored by the mirror is seen. Every change of distance of the mirror 12 produces a change of the measured value by an amount that is double of that of a measurement with an arrangement in accordance with FIG. 1. This also signifies that this procedure provides a measuring sensitivity increased by a factor of 2.

Figure 4:
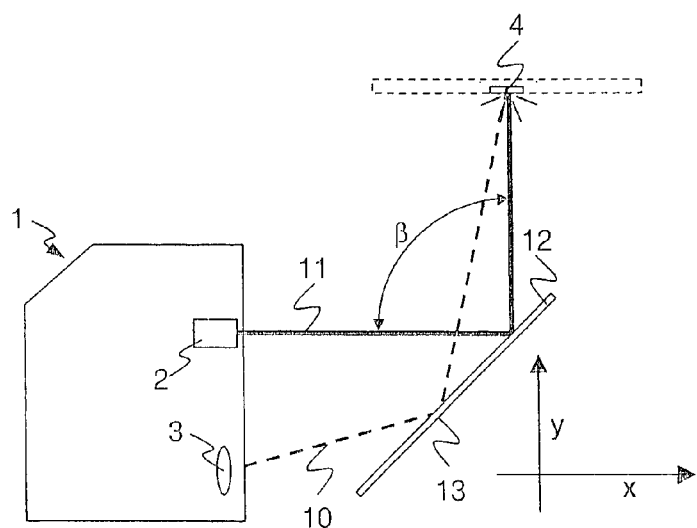

The beam path of the light beam 11 after the first mirroring does not necessarily have to be almost vertical to a front surface of the sensor, respectively vertical to the mirror, but may also be utilised when reflected by a large angle β of, for example, 45 to 135 degrees, in particular in a range of around 90 degrees. In that case, the detection of a lateral displacement of an object is possible, this means in the direction y running vertically to the beam direction of the reflected light beam 11. An arrangement of this kind is depicted in FIG. 4. The figure illustrates the utilisation of a triangulation sensor 1 for the distance measurement through a mirror 12, respectively, an object with a reflective surface 12. The reflector 4, as is indicated by dashed lines, may also be relatively large and as a result of this absorb inaccuracies in the position of the mirror. Every change of distance of the mirror 12 produces a change of the measured value by the double amount. In this arrangement, optionally, resp., simultaneously displacements of the reflective surface 12 in different directions x and y are capable of being detected.

Figure 5:
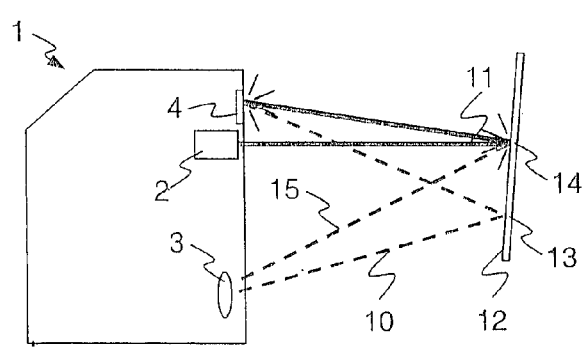
FIG. 5 illustrates an arrangement similar to those of the FIGS. 2 and 3, wherein on the surface of the "mirror" a slight scattering takes place.

With the triangulation sensor 1 it is also possible to still take measurements when a slight scattering takes place at the reflective surface 12. The sensor 1 then "sees" two neighbouring light spots, as is illustrated in FIG. 5. In this figure, the reflected light spot of the reflector is designated with the reference numeral 13, a light spot produced by scattered light from the mirror with 14, and a light beam produced by the scattered light and capable of being detected is designated with 15. From the positioning of the reflector 4 relative to the light beam 11 and to the mirror 12 it follows whether the first or the second light spot originates from the reflector. The correct light spot is selected by an evaluation logic circuit in the receiver and with it the correct distance is determined. For example, in the case of an angle predefined by the holder 16 as in FIG. 5, it is clear that the light beam a impinging under a first, smaller angle of incidence is the indirectly reflected and mirrored light beam 10 and that the light beam 15 impinging under a greater angle is the one that has been produced by scattered light from the mirror.

Figure 6:
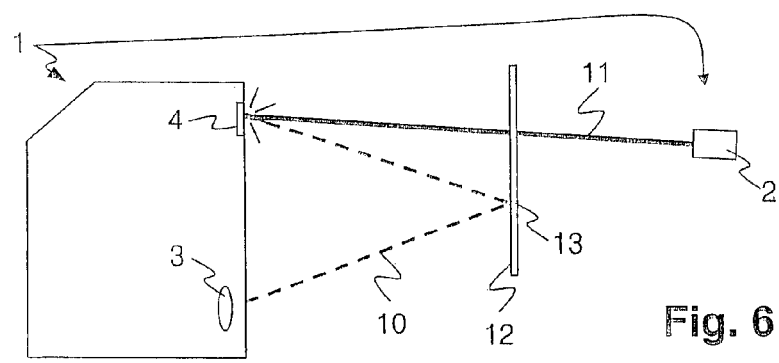
FIGS. 6 and 7 illustrate further arrangements according to the invention.

Alternatively, in another embodiment the of the invention the angles of incidence of both light spots 13, 14 are evaluated by computation or with an electronic circuit and, from this, two distance values and a combined distance value, for example, as an average value, are determined. Apart from the illustrated examples of embodiments, a great multitude of further arrangements is possible within the scope of the action in accordance with the invention. In particular also arrangements according to FIG. 6 are possible, in which the light beam is guided directly to the reflector, without having been reflected by the mirror beforehand. This can take place, for example, in that the light source is offset, for example, vertically to the plane of the drawing and viewed from the receiving lens system 3 is positioned "behind" the mirror. In this case the slightly inclined arrangement of the mirror is not indispensably necessary anymore.

Figure 7:
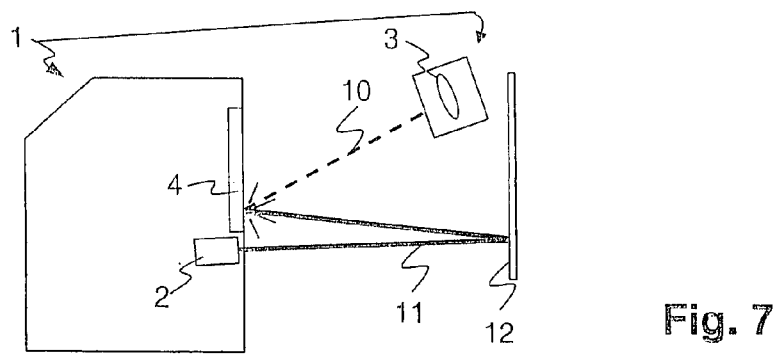

Finally, arrangements according to FIG. 7 are also possible, wherein the light beam is reflected from the mirror onto a reflector, and wherein the light diffusely reflected from the reflector is directly detected by the receiving lens system. Also in this case, by means of a triangulation a conclusion regarding the position of the mirror is possible, resp., it is possible to make a statement, as to whether the mirror is in a certain area or not.

Also possible are combinations of the embodiments as well as adaptations or modifications of them.

LIST OF REFERENCE CHARACTERS 1 optical sensor
2 light source
3 receiving lens system
4 reflector
10 reflected light beam
11 light beam
12 mirroring surface 13 mirrored light spot of the reflector
14 light spot resulting from scattered light from the mirror
15 light beam produced by scattered light from the mirror
16 holder, guide

The invention claimed is:

1. A method for optical distance measurement or for optical detection of an object, said object having an at least partially reflective surface, comprising the steps of:
   providing a diffusely scattering reflector at a position spaced from the object;
   directing a light beam to the reflective surface;
   reflecting the light beam off the reflective surface such that the reflected light beam impinges on the diffusely scattering reflector;
   diffusely scattering the reflected light with the diffusely scattering reflector;
   reflecting the diffusely scattered light off of the reflective surface and thereby redirecting the diffusely scattered light to a light receiving means;
   receiving the redirected diffusely scattered light at the light receiving means; and,
   detecting and evaluating the redirected diffusely scattered light received by the light receiving means.

2. The method according to claim 1, wherein the step of redirecting the diffusely scattered light to the light receiving means comprises the step of:
   redirecting the diffusely scattered light to a receiving lens system of the light receiving means by the reflective surface.

3. A device for optical distance measurement or for optical detection of an object, said object having an at least partially reflective surface, said device comprising:
   a light source for generating a light beam,
   light receiving means and evaluation means for evaluating light signals received through the light receiving means, and,
   an at least partially diffusely scattering reflector, the diffusely scattering reflector being spaced from the reflective surface, wherein said light source, reflective surface, said diffusely scattering reflector, and said light receiving means are positioned such that light is directed from the light source to the light receiving means by the reflective surface and the diffusely scattering reflector, and wherein the light source, the light receiving means and the diffusely scattering reflector are integrated in a sensor.

4. The device in accordance with claim 3, wherein the light source and the reflector are arranged such that, during operation of the device, the light beam produced by the light source impinges on the reflective surface with an angle of incidence of less than 45 degrees to a direction normal to the reflective surface.

5. The device according to claim 3, wherein the light source and the reflector are arranged such that, during operation of the device, the light beam produced by the light source impinges on the reflective surface with an angle of incidence of more than 30 degrees to a direction normal to the reflective surface.

6. The device in accordance with claim 3, further comprising a holder or guide for arrangement of the object having said at least partially reflective surface in a position defined with respect to the light source and the diffusely scattering reflector.

7. The device according to claim 3, further comprising means for evaluating angles of incidence of two light beams and for determining corresponding distance values.

8. A method for use of the device according to claim 3 for detecting a position of a silicon wafer surface, said silicon wafer providing said reflective surface, comprising the steps of:
   generating light with the light source,
   directing light to the diffusely scattering reflector, which is spaced from said reflective surface, and diffusely scattering light from said diffusely scattering reflector;
   detecting diffusely scattered light with said light receiving means;
   evaluating detected diffusely scattered light with said light receiving means so as to determine the position of said silicon wafer.

9. The method of use according to claim 8, wherein the step of directing light to the reflector comprises the steps of:
   directing light from the light source to the reflective surface;
   reflecting light from said reflective surface; and,
   directing light reflected from said reflective surface to the diffusely scattering reflector.

10. The method of use according to claim 9, wherein diffusely scattered light from the diffusely scattering reflector is directed to the light reflecting surface and reflected thereby to the light receiving means.

* * * * *